United States Patent [19]
Endoh

[11] Patent Number: 5,508,996
[45] Date of Patent: Apr. 16, 1996

[54] OPTICAL DISC HAVING AN OFFSET TRACKING GROOVE FOR REPRESENTING MULTI-VALUE DIGITAL INFORMATION SIGNALS AND REPRODUCING APPARATUS THEREFOR

[75] Inventor: Sohmei Endoh, Tokyo, Japan

[73] Assignee: Sony Corporation, Tokyo, Japan

[21] Appl. No.: 962,613

[22] Filed: Oct. 16, 1992

Related U.S. Application Data

[63] Continuation of Ser. No. 691,469, Apr. 25, 1991, abandoned.

[30] Foreign Application Priority Data

Apr. 28, 1990 [JP] Japan ..................... 2-113267

[51] Int. Cl.$^6$ ..................................... G11B 7/00
[52] U.S. Cl. ................... 369/275.3; 369/275.4; 369/100
[58] Field of Search ................. 369/100, 275.4, 369/109, 99, 44.41, 44.34, 32, 44.26, 59, 47, 275.1, 275.3

[56] References Cited

U.S. PATENT DOCUMENTS

| | | | |
|---|---|---|---|
| 4,586,173 | 4/1986 | Ando | 369/275.4 |
| 4,707,816 | 11/1987 | Yonezawa et al. | 369/44.26 |
| 4,963,464 | 10/1990 | Setani | 369/109 |

FOREIGN PATENT DOCUMENTS

| | | | |
|---|---|---|---|
| 60-121553 | 6/1985 | Japan | 369/275.4 |
| 61-151843 | 7/1986 | Japan | 369/275.4 |
| 61-162829 | 7/1986 | Japan | 369/275.4 |
| 62-78729 | 4/1987 | Japan | 369/275.4 |
| 62-298946 | 12/1987 | Japan | 369/275.4 |
| 63-64647 | 3/1988 | Japan | 369/275.4 |
| 63-211122 | 9/1988 | Japan | 369/275.1 |
| 1211247 | 8/1989 | Japan | 369/275.4 |
| 2-68721 | 3/1990 | Japan | 369/275.4 |
| 2-201735 | 9/1990 | Japan . | |

Primary Examiner—Nabil Z. Hindi
Attorney, Agent, or Firm—Limbach & Limbach; Phillip M. Shaw, Jr.

[57] ABSTRACT

An optical disc for recording an information signal having a plurality of states has a portion on which a groove is formed in a predetermined direction, and the groove has a nominal position in the direction perpendicular to the predetermined direction over a predetermined length that represents a first state the information signal. The disc also has a portion on which the groove is not formed that represents a second state of the information signal. The groove can also be displaced from its nominal position in the direction perpendicular to the predetermined direction over a predetermined length, the amount of the displacement representing at least one further state of the information signal. An apparatus for reproducing such a disc has a light source illuminating the optical disc, at least two detectors that each generate an electrical signal in response to light by the optical disc, a first and a second calculating circuit each for calculating at least one result signal in response to the electrical signals from the detectors, and a multiple-value signal generator that generates an output signal having a plurality of states in response to a first result signal from the first calculating circuit and a third signal. The third signal is derived from the first result signal and a second result signal from the second calculating circuit.

8 Claims, 6 Drawing Sheets

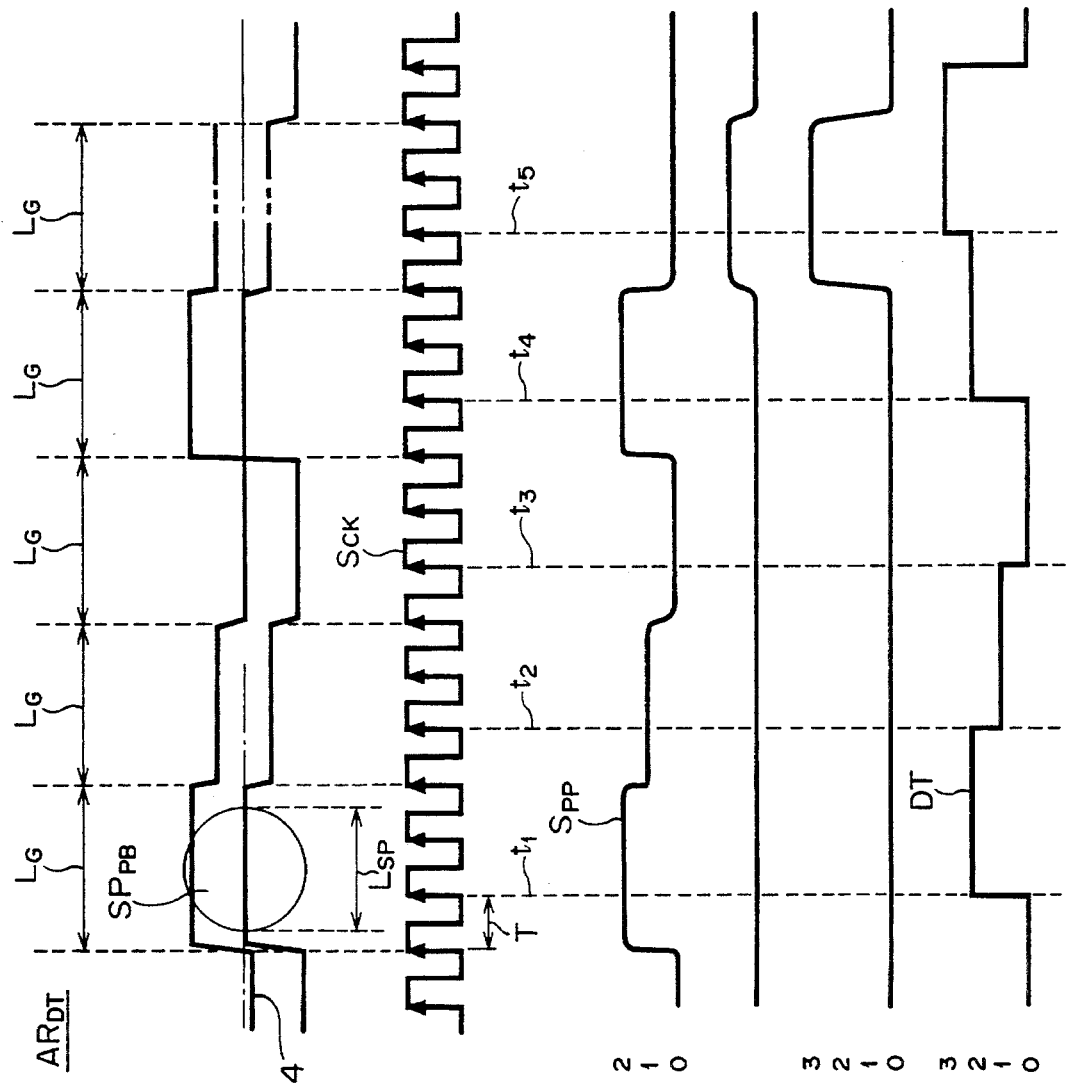

OPTICAL DISC HAVING AN OFFSET TRACKING GROOVE FOR REPRESENTING MULTI-VALUE DIGITAL INFORMATION SIGNALS AND REPRODUCING APPARATUS THEREFOR

This is a continuation of application Ser. No. 07/691,469 filed on Apr. 25, 1991 abandoned Nov. 24, 1992.

BACKGROUND OF THE INVENTION

1. Field of the Invention

The present invention relates to an optical disc and a reproducing apparatus for this optical disc suitable for use, for example, in a CD ROM (compact disc read only memory) or the like.

2. Description of the Prior Art

The assignee of the present application has previously proposed an optical disc and a reproducing apparatus for reproducing such optical disc as shown in FIGS. 1 and 2 (see Japanese Patent Application No. 1-22212). More specifically, in FIG. 1, reference numeral 1 generally designates a disc reproducing apparatus, wherein an optical disc 2, on which multiple-value information signal composed of four digital signal values is recorded in a groove, is driven by a spindle motor 3 and controlled so as to rotate at a predetermined rotational speed about a central axis 0.

Actually, on this optical disc 2, there are formed recording tracks. Each of the tracks is formed of a groove 4. The groove 4 is, as shown in FIG. 2, is divided into a data recording area $AR_{DT}$ and a reference signal recording area $AR_{REF}$ at predetermined time intervals, and the recording tracks formed of grooves 4 are concentrically formed with a track pitch represented by Tp.

The groove 4 is formed so as to have a depth of $\lambda/8$ with respect to a wavelength $\lambda$ of a laser beam $L_1$ irradiating the optical disc 2, and a groove width Tw having a value Tp/2 with respect to the track pitch Tp.

Further, the groove 4 in the data recording area $AR_{DT}$ has a first condition $S_1$ where the groove center GC is formed with an offset of 1.5ΔA on the upward side from the track center TC, a second condition $S_2$ formed with an offset of 0.5ΔA on the upward side, a third condition $S_3$ formed with an offset of 0.5ΔA on the downward side from the track center TC, and a fourth condition $S_4$ with an offset of 1.5ΔA on the downward side, which are repeated respectively corresponding to values of a four-value digital signal $[3]_4$, $[2]_4$, $[1]_4$ and $[0]_4$, for example, in a clock cycle of this digital signal.

On the other hand, the reference signal recording area $AR_{REF}$ is divided into a synchronizing signal recording area $AR_{SYS}$, and an amplitude signal recording area $AR_{AD}$, wherein a synchronizing signal and a reference signal are respectively recorded therein.

More specifically, in the synchronizing signal recording area $AR_{SYS}$, pits P are formed on the track center TC by periodically interrupting the groove 4 at a rate equal to the clock frequency of the digital information signal. When pits P are reproduced, they generate a synchronizing signal having a frequency equal to the clock frequency of the digital information signal.

Also, in the subsequent amplitude signal recording area $AR_{AD}$ offset information related to the groove 4 formed on the data recording area $AR_{DT}$ is recorded.

More specifically, the groove 4 formed on the data recording area $AR_{DT}$ includes the first condition $S_1$ with the largest offset on the upward side from the track center TC and the fourth condition $S_4$ with the largest offset on the downward side which are respectively formed, for example, for five cycles of the system clock.

Incidentally, in the optical disc reproducing apparatus 1, the laser beam $L_1$ having a wavelength $\lambda$ emitted from a laser light source 5 is converted to a parallel light by a collimator lens 6, passed through a beam splitter 7, and then converged on the optical disc 2 through an objective lens 8, thereby forming a beam spot $SP_{PB}$ for reproduction.

A reflected laser beam $L_2$ which is composed of the reproducing beam spot $SP_{PB}$ reflected on the optical disc 2, passes through objective lens 8, is reflected by the beam splitter 7 by 90 degrees and is converged by condenser to a photo detector 10 which is split into two parts 10A and 10B in the recording track direction.

Received light output signals $S_{PD1}$ and $S_{PD2}$ generated from respective light receiving elements 10A and 10B of the split photo detector 10 are inputted to a subtractor circuit 11 and an adder circuit 12 respectively, these circuits being composed of operational amplifier circuits.

The subtractor circuit 11 calculates the difference between respective received light output signals $S_{PD1}$ and $S_{PD2}$ from the split photo detector 10, and delivers the resulting difference signal Spp to a multiple-value signal reproducing circuit 13.

Also, the adder circuit 12 calculates the sum of respective received light output signals $S_{PD1}$ and $S_{PD2}$ and delivers the resulting sum signal $S_{RF}$ to a clock signal generating circuit 14, circuit 14 having a phase-lock loop (PLL) configuration.

With this arrangement, the clock signal generating circuit 14 generates a clock signal $S_{CK}$ based on the synchronizing signal recorded on the synchronizing signal recording area $AR_{SYS}$ in the reference signal recording area $AR_{REF}$, and delivers the same to the multiple-value signal reproducing circuit 13.

The multiple-value signal reproducing circuit 13, using the offset information in the groove 4 recorded on the amplitude signal recording area $AR_{AD}$ in the reference signal recording area $AR_{REF}$, sets the levels of the difference signal Spp corresponding to the four values of the digital information signal $[3]_4$, $[2]_4$, $[1]_4$ and $[0]_4$, and samples the difference signal Spp at the timing of the clock signal $S_{CK}$, to reproduce the four values of the digital information signal DT recorded on the data area $AR_{DT}$. This four-value digital information signal DT is outputted to the outside through an output terminal 15.

Incidentally, when an information signal is recorded by displacing the groove 4 in the direction perpendicular to the direction of the groove, if the width Tw of the groove 4 is changed with respect to the track pitch Tp, the level of the difference signal Spp is largest when the groove width Tw is equal to half the track pitch Tp or Tp/2, whereas the level of the sum signal SRF is substantially zero.

Therefore, in the above-mentioned example, by setting the width Tw of the groove 4 to the value Tp/2, when the reproducing beam spot $SP_{PB}$ scans the data recording area $AR_{DT}$ and the amplitude signal recording area $AR_{AD}$, the level of the difference signal Spp changes in proportion to a displacement amount of the groove 4 in the direction perpendicular to the direction of the groove while the level of the sum signal $S_{RF}$ maintains a substantially constant value.

On the contrary, when the reproducing beam spot $SP_{PB}$ scans the synchronizing signal recording area $AR_{SYS}$, and the groove 4 is intermittently formed on the track center TC, the level of the difference signal Spp maintains a zero level while the level of the sum signal $S_{RF}$ changes in accordance with the interruptions in the groove 4.

Thus, the synchronizing signal is recorded on the synchronizing signal recording area $AR_{SYS}$ by interrupting the groove 4, while the multiple-value signal and the reference signal are recorded in the data recording area $AR_{DT}$ and the amplitude signal recording area $AR_{AD}$ in the form of displacement amounts of the groove 4 in the direction perpendicular to the direction of the groove, whereby the multiple-value signal and the reference signal are only derived as the difference signal Spp through the subtractor circuit 11, and the synchronizing signal is only derived as the sum signal $S_{RF}$ through the adder circuit 12. This makes it possible to separate the synchronizing signal from the multiple-value signal and the reference signal and securely and easily detect the same.

Also, in this example, as shown in FIG. 3, the data recording area $AR_{DT}$ in the groove 4 (FIG. 3A) on the optical disc 2 is displaced in the direction perpendicular to the direction of the groove in the first, second, third and fourth conditions S1, S2, S3 and S4 corresponding to the values $[3]_4$, $[2]_4$, $[1]_4$ and $[0]_4$ of the four-value digital information signal over every groove length LG corresponding to, for example, three cycles of the clock signal $S_{CK}$ (FIG. 3B).

The spot diameter $L_{SP}$ of the reproducing beam spot $SP_{PB}$ formed on the optical disk 2 by the laser beam $L_1$ emitted from the laser light source 5 is set to a sufficiently small value with respect to the groove length LG of the groove 4.

Thus, in the multiple-value signal reproducing circuit 13 in the optical disc reproducing apparatus 1 (refer to FIG. 1), the inputted push-pull signal Spp (FIG. 3C) is sampled at times $t_1, t_2, t_3, t_4, t_5, \ldots$, i.e., at the rising edge of the second clock cycle which corresponds to the substantially central portion of each groove length LG. The output of multiple value reproducing circuit 13 is held for the subsequent three clock cycles, whereby the data recording area $AR_{DT}$ can be correctly reproduced to derive the four-value digital information signal DT (FIG. 3D).

Thus, conventionally, on the basis of a four-value digital signal, a groove displaced at every predetermined groove length is irradiated with a reproducing beam spot having a spot diameter shorter than the groove length, and the resulting differential signal is sampled to detect displacement amounts of the groove, to thereby detect the four-value digital signal.

As is apparent from the foregoing, conventionally, to derive the four-value digital information signal (multiple-value signal), the groove 4 must be formed on the optical disc 2 such that the groove center cc is offset by 1.5ΔA and 0.5ΔA from the track center TC on the upward side and by 1.5ΔA and 0.5ΔA from the track center TC on the downward side. This complicates forming the groove 4 on the optical disc 2 and complicates the signal processing in the optical disc reproducing apparatus for deriving the four-value digital information signal therefrom.

OBJECTS AND SUMMARY OF THE INVENTION

Accordingly, it is an object of the present invention to provide an improved optical disc and reproducing apparatus therefor in which the aforenoted shortcomings and disadvantages of the prior art are eliminated.

More specifically, it is an object of the present invention to provide an optical disc with a simple structure which allows multiple-value signals to be recorded with a high recording density.

It is another object of the present invention to provide an optical disc reproducing apparatus which is capable of deriving multiple-value signals from the optical disc in a simple and favorable manner.

According to a first aspect of the present invention, an optical disc for recording an information signal having a plurality of states is comprised of a portion on which a groove is formed in a predetermined direction, and the groove has a nominal position in the direction perpendicular to the predetermined-direction over a predetermined length that represents a first state the information signal. The disc is also comprised of a portion on which the groove is not formed that represents a second state of the information signal. The groove can also be displaced from its nominal position in the direction perpendicular to the predetermined direction over a predetermined length, the amount of the displacement representing at least one further state of the information signal.

In accordance with a second aspect of the present invention, a reproducing apparatus for an optical disc is comprised of a light emitting device for emitting a light onto an optical disc which is provided with a portion where a groove is formed in a predetermined direction with a predetermined displacement amount in the direction perpendicular to the predetermined direction and over a predetermined length, and a portion where the groove is not formed, at least two detecting circuits for detecting a light from the optical disc by means of the light emitting device, first and second calculating circuits for separately calculating at least two detected signals from at least the two detecting circuits, and a multiple-value signal generating circuit for generating multiple values, based on first and second result signals from the first and second calculating circuits, from the first result signal from the first calculating circuit.

A third aspect of the invention is a reproducing apparatus for reproducing an optical disc on which an information signal having a plurality of states is recorded. The disc has a portion on which a groove is formed in a predetermined direction, and the groove has a nominal position in the direction perpendicular to the predetermined direction over a predetermined length that represents a first state of the information signal. The disc also has a portion where the groove is not formed that represents a second state of the information signal. The groove can be displaced from its nominal position in the direction perpendicular to the predetermined direction over a predetermined length, the amount of the displacement representing at least one further state of the information signal. The reproducing apparatus according to the third aspect of the invention comprised of the following:

a light emitting means for emitting a light onto the optical disc, at least two detecting means each for generating an electrical signal in response to the light from the light emitting means reflected by the optical disc, a first and a second calculating means each for calculating at least one result signal in response to the electrical signals from the at least two detecting means, and a multiple-value signal generating means for generating an output signal having a plurality of states in response to a first result signal from the first calculating means and a third signal. The third signal is derived from the first result signal and a second result signal from the second calculating means.

The above, and other objects, feature and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIGS. 6A through 6F are schematic diagrams, respectively, used to explain operation of the embodiment of the optical disc reproducing apparatus according to the present invention.

DETAILED DESCRIPTION OF THE PREFERRED EMBODIMENT

An embodiment of an optical disc and its reproducing apparatus according to the present invention will hereinafter be described with reference to FIG. 4 through FIGS. 6A to 6F.

Figure 1:
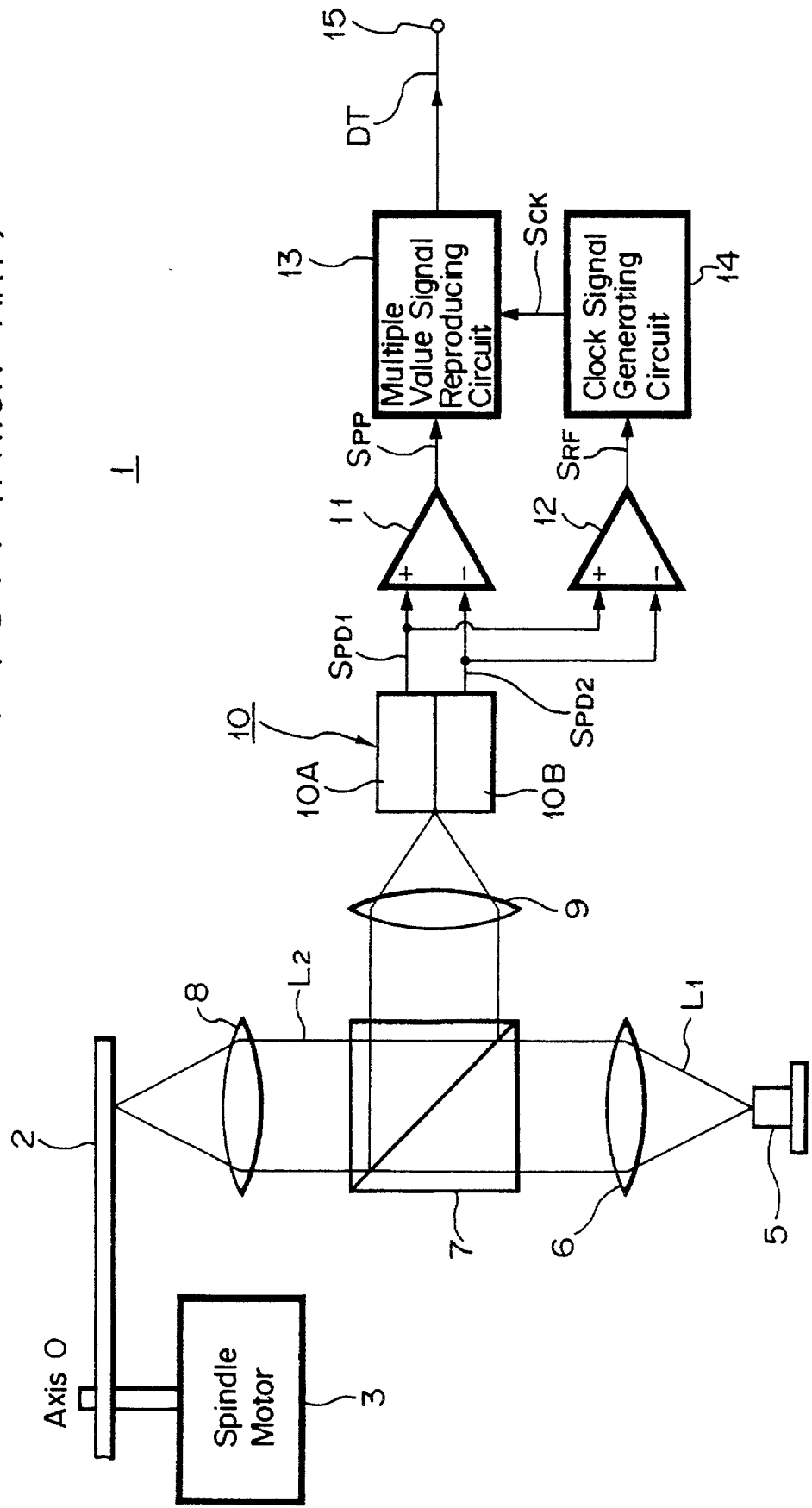
FIG. 1 is a schematic diagram showing an arrangement of an optical disc reproducing apparatus according to the prior art.
Figure 2:
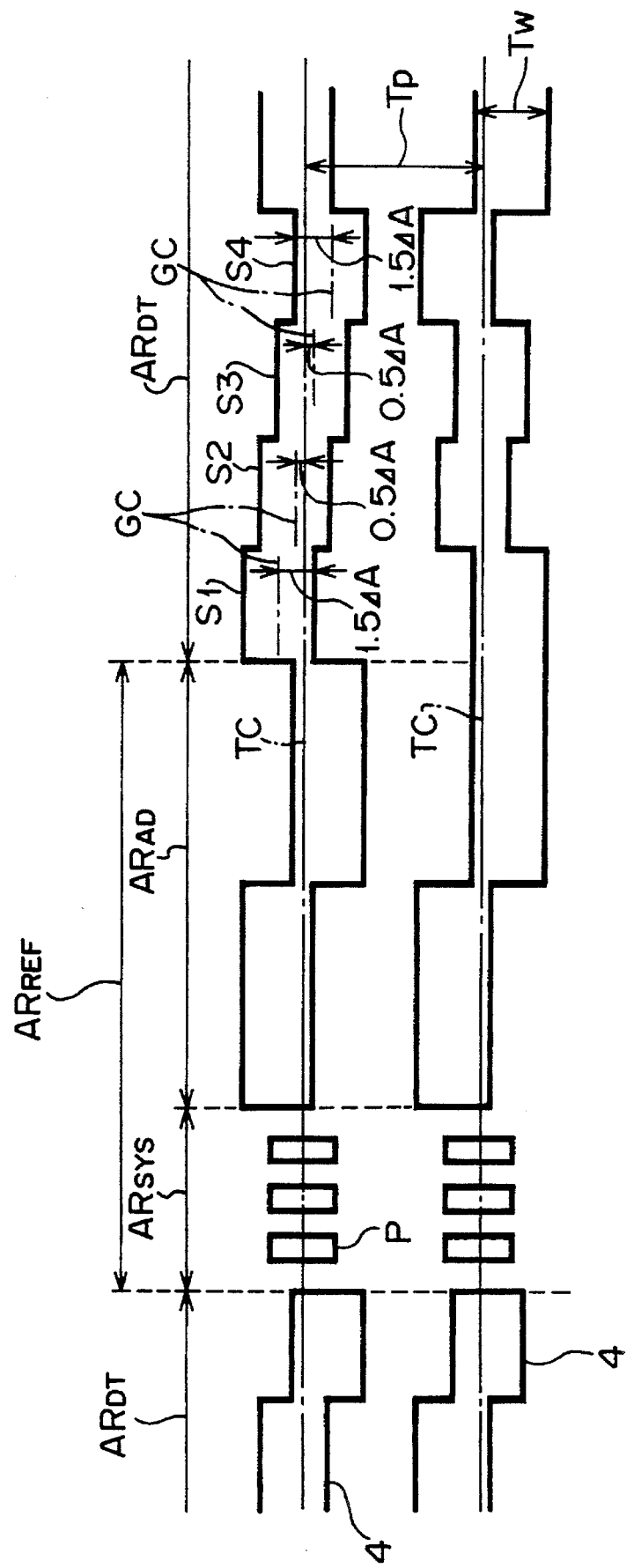
FIG. 2 is a schematic representation used to explain an optical disc according to the prior art.
Figures 3A, 3B, 3C, 3D:
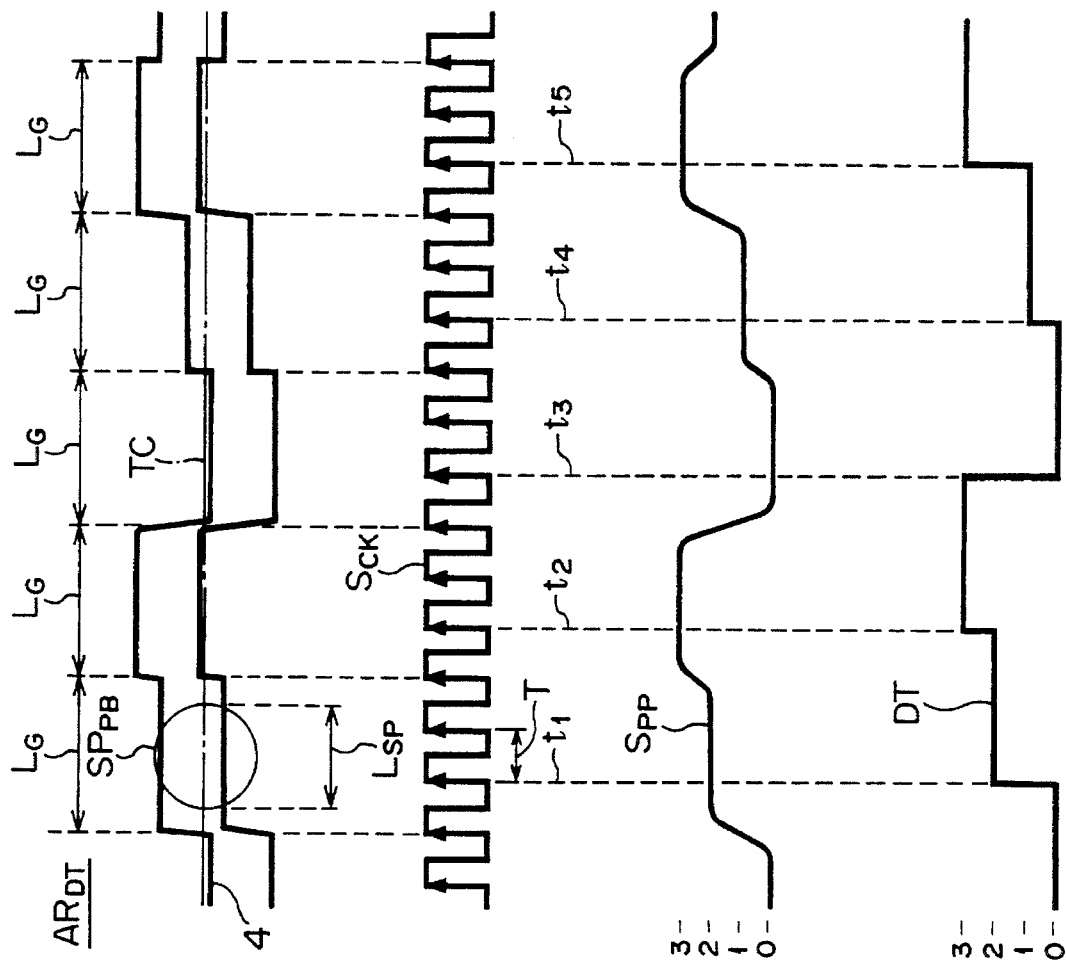
FIGS. 3A through 3D are schematic diagrams, respectively, used to explain operation of the conventional optical disc reproducing apparatus of FIG. 1.
Figure 4:
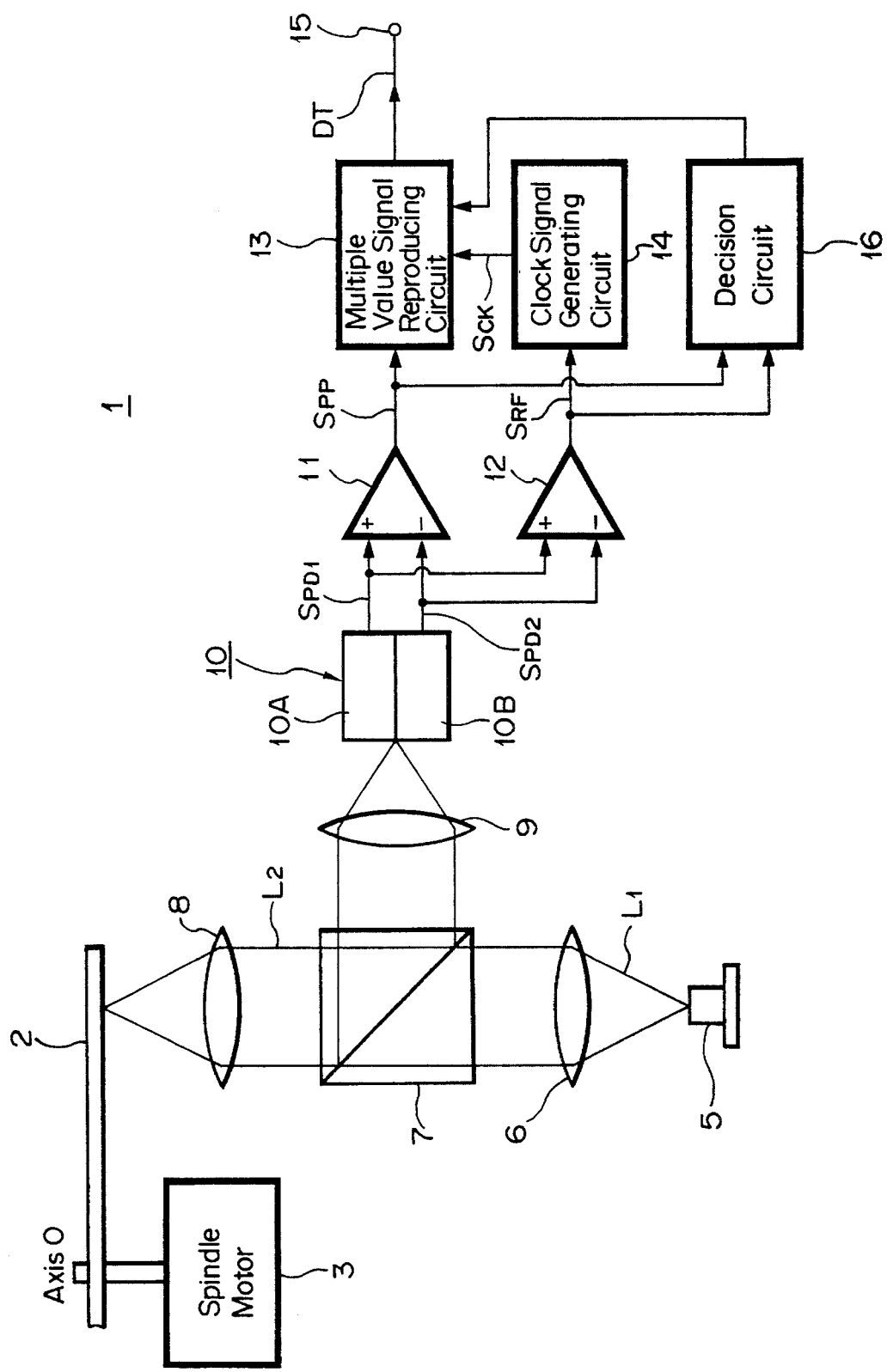
FIG. 4 is a schematic diagram showing an arrangement of an embodiment of an optical disc reproducing apparatus according to the present invention.

In FIG. 4, reference numeral 1 generally designates the optical disc reproducing apparatus according to the present invention, wherein an optical disc 2, on which a multiple-value information signal composed of four digital signal values is recorded in the form of groove, is driven by a spindle motor 3 and controlled to rotate at a predetermined rotational speed about the central axis O.

On the optical disc 2 according to the present embodiment, there are formed recording tracks. Each of the recording tracks is formed of a groove 4. The groove 4 is, as shown in FIG. 5, is divided into a data recording area $AR_{DT}$ and a reference signal recording $AR_{REF}$ area at predetermined time intervals, and the recording tracks formed of grooves 4 are concentrically formed with a track pitch Tp.

The groove 4 is formed so as to have a depth of a value $\lambda/8$ with respect to a wavelength of a laser beam $L_1$ irradiated on the optical disc 2 and a groove width Tw of a value Tp/2 with respect to the track pitch Tp.

Figure 5:
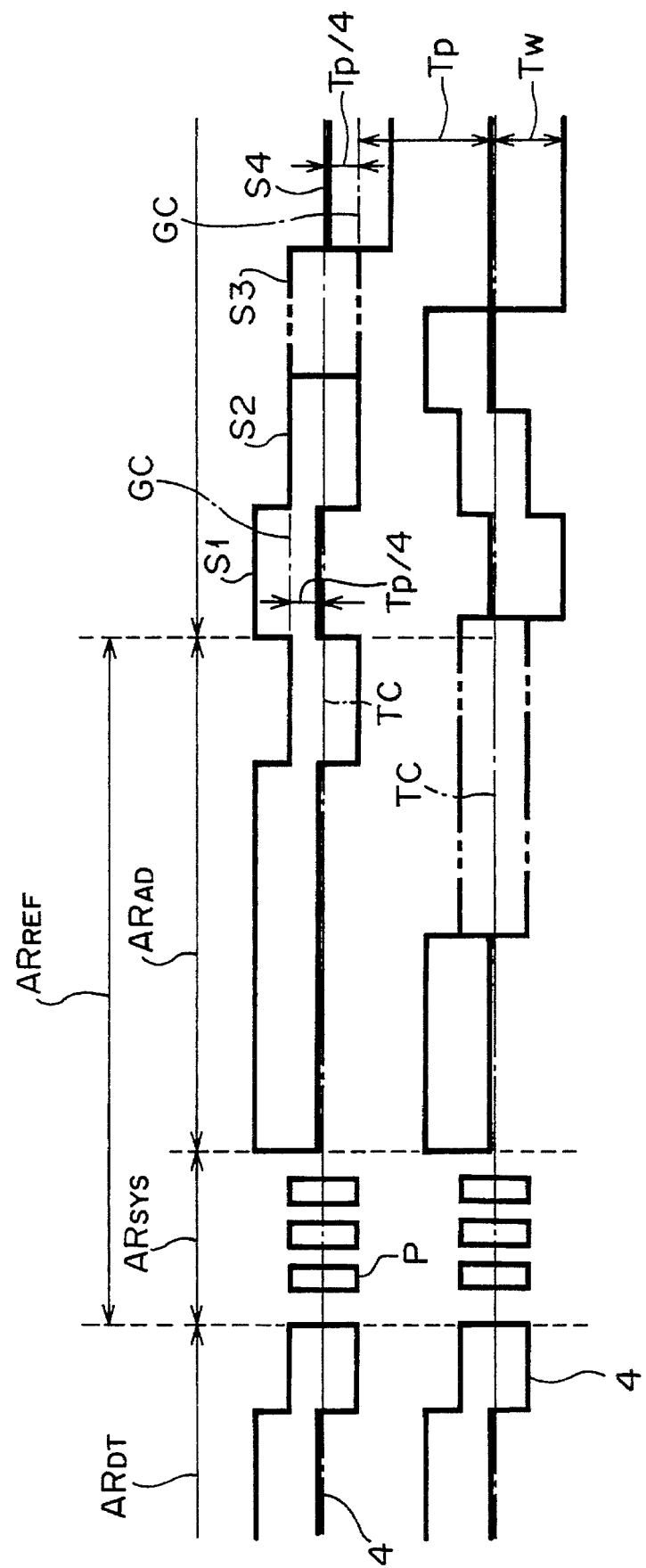
FIG. 5 is a schematic representation used to explain an embodiment of an optical disc according to the present invention.

Further, the groove 4 includes, in the data recording area $AR_{DT}$, a first condition $S_1$ which is formed by offsetting the groove center GC from the track center TC by, for example, approximately Tp/4 on the upward side, a second condition $S_2$ which is formed with the track center TC coincident with the groove center GC, a third condition $S_3$ where the groove 4 is not formed, as indicated by a two-dot chain line in FIG. 5, and a fourth condition $S_4$ which is formed by offsetting the groove center GC by, for example, approximately Tp/4 on the downward side, these four conditions respectively corresponding to the values of the four-value digital information signal $[3]_4$, $[2]_4$, $[1]_4$ and $[0]_4$. These conditions are repeated, for example, according to the clock cycle of this digital information signal.

Incidentally, the above-mentioned offset amount (deviated amount) can be set to approximately ±0.1 μm, by way of example.

The reference signal recording area $AR_{REF}$, on the other hand, is divided into a synchronizing signal recording area $AR_{SYS}$ and an amplitude signal recording area $AR_{RD}$, where a synchronizing signal and a reference signal are recorded, respectively.

More specifically, in the synchronizing signal recording area $AR_{SYS}$, pits P are formed on the track center TC by periodically interrupting the groove 4 at a rate equal to the clock frequency of the digital information signal. When pits P are reproduced, they generate a synchronizing signal having a frequency equal to the clock frequency of the digital information signal.

Also, in the subsequent amplitude signal recording area the offset information related to the groove 4 formed on the data recording area $AR_{DT}$ is recorded.

More specifically, the groove 4 formed on the data recording area $AR_{DT}$ is composed of the first condition $S_1$ where the groove center GC is maximally offset from the track center TC on the upward side and the fourth condition $S_4$ wherein it is maximally offset on the downward direction are respectively formed, for example, for five cycles of the clock.

Incidentally, in the optical disc reproducing apparatus 1, the laser beam $L_1$ with the wavelength $\lambda$ emitted from the laser light source 5 is converted to a parallel light through a collimator lens 6, passed through a beam splitter 7, and then converged on the optical disc 2 through an objective lens 8 to form a beam spot $SP_{PB}$ for reproduction. Thus, a reflected laser beam $L_2$ formed of the reproducing beam spot $SP_{SB}$ reflected on the optical disc 2 passes through objective 8, is reflected through 90 degrees by the beam splitter 7, and is converged by condenser lens 9 on a photo detector 10, which is split into two parts 10A and 10B in the recording track direction.

Received light output signals $S_{PD1}$ and $S_{PD2}$ generated from respective light receiving elements 10A and 10B of the split photo detector 10 are inputted to a subtractor circuit 11 and an adder circuit 12, respectively, these circuits being formed of operating amplifier circuits.

The subtractor circuit 11 calculates the difference between the respective light received output signals $S_{PD1}$ and $S_{PD2}$ and delivers the resulting difference signal Spp to a multiple-value signal reproducing circuit 13 and a decision circuit 16, respectively.

The adder circuit 12, on the other hand, calculates the sum of the respective light received output signals $S_{PD1}$ and $S_{PD2}$ and delivers the resulting sum signal $S_{RF}$ to a clock signal generating circuit 14, circuit 14 having a phase-lock loop (PLL) configuration, and to the decision circuit 16, respectively.

Thus, the clock signal generating circuit 14 generates a clock signal $S_{CK}$ based on the synchronizing signal recorded on the synchronizing signal recording area $AR_{SYS}$ in the reference signal recording area $AR_{REF}$, and delivers the same to the multiple-value signal reproducing circuit 13.

The decision circuit 16, when the level of the difference signal Spp from the subtractor circuit Il has a low level and the level of the sum signal $S_{RF}$ from the adder circuit 12 has a high level, amplifies the sum signal $S_{RF}$ up to a predetermined level and supplies the same to the multiple-value signal reproducing circuit 13.

Thus, the multiple-value signal reproducing circuit 13 sets the levels of the difference signal Spp corresponding to the values of the four-value digital information signal values $[3]_4$, $[2]_4$, $[1]_4$ and $[0]_4$, using information related to the offset of the groove 4 recorded on the amplitude signal recording area $AR_{AD}$ in the reference signal recording area $AR_{REF}$ and information on the presence or absence of the groove. The multiple-value signal reproducing circuit 13 also samples the difference signal Spp and the output signal from the decision circuit 16 at the timing of the clock signal $S_{CK}$, thereby reproducing the four-value digital information signal DT recorded on the data recording area $AR_{DT}$. This four-value digital information signal DT is outputted to the outside through an output terminal 15.

Incidentally, when an information signal is recorded by displacing the groove 4 in the direction perpendicular to the direction of the groove, if the groove width Tw is varied with respect to the track pitch Tp, the level of the difference signal Spp is largest, and the level of the sum signal $S_{RF}$ is substantially zero, when the groove width Tw is equal to a half of the track pitch Tp or a value Tp/2.

Therefore, in this embodiment, by setting the width Tw of the groove 4 at the value Tp/2, the level of the difference signal Spp varies in proportion to displacement amount of the groove 4 in the direction perpendicular to the direction of the groove, while the level of the sum signal $S_{RF}$ maintains a substantially constant value, when the reproducing beam spot $SP_{PB}$ scans the amplitude signal recording area $AR_{AD}$.

Since the groove 4 is periodically interrupted on the track center TC when the reproducing beam spot $SP_{PB}$ scans the synchronizing signal recording area $AR_{SYS}$ the level of the difference signal Spp maintains a zero level, while the level of the sum signal $S_{RF}$ varies in accordance with the interruptions in the groove 4.

Thus, the synchronizing signal is recorded on the synchronizing signal recording area $AR_{SYS}$ by interrupting the groove 4, while the multiple-value signal and the reference signal are recorded on the data recording area $AR_{DT}$ and the amplitude signal recording area $AR_{AD}$ by displacement amounts of the groove 4 in the direction perpendicular to the direction of the groove and by the presence or absence of groove 4, thereby making it possible to derive only the multiple-value signal and the reference signal as the difference signal Spp through the subtractor circuit 11 and to derive only the synchronizing signal as the sum signal $S_{RF}$ through the adder circuit 12, whereby the synchronizing signal can be separated from the multiple-value signal and the reference signal and securely and easily detected.

Also, in the present embodiment, as shown in FIG. 6, the data recording area $AR_{DT}$ of the groove 4 (FIG. 6A) on the data recording area $AR_{DT}$ on the optical disc 2 is displaced or is not displaced in the direction perpendicular to the direction of the groove in the first, second, third and fourth conditions $S_1$, $S_2$, $S_3$ and $S_4$ corresponding to the values of the four-value digital information signal $[2]_4$, $[1]_4$, $[3]_4$, $[0]_4$, over every groove length LG corresponding to, for example, three cycles of the clock signal $S_{CK}$ (FIG. 6B).

In this embodiment, the spot diameter $L_{SP}$ of the reproducing beam spot $SP_{PB}$ formed on the optical disc 2 by the laser beam $L_1$ emitted from the laser light source 5 is selected to be a sufficiently small value relative to the groove length LC of the groove 4.

Also, as indicated by a two-dot chain line in FIG. 6A, if there is a portion on which the groove 4 is not formed, the output signal from the adder circuit 12 (see FIG. 4) becomes a high level signal corresponding to that part, as shown in FIG. 6D. Then, the decision circuit 16 detects the level of this signal, amplifies the same to a predetermined level as shown in FIG. 6E, and supplies the same to the multiple-value signal reproducing circuit 13.

Thus, in the multiple-value signal reproducing circuit 13 of the optical disc reproducing apparatus 1 (see FIG. 4), the inputted difference signal $S_{PF}$ (FIG. 6C) and the signal (FIG. 6E) from the decision circuit 16 are sampled at times $t_1$, $t_2$, $t_3$, $t_4$, $t_5$, ..., i.e., at the rising edge cycle of the second clock cycle which corresponds to the substantially central portion of each groove length LG. The output of multiple value signal reproducing circuit is held for the subsequent 3 clock cycles, thereby making it possible to correctly reproduce the data recording area $AR_{DT}$ to derive the four-value digital information signal DT (FIG. 6P).

In the prior art embodiment, the groove 4 has conventionally been formed on the optical disc 2 by offsetting the groove center GC by 1.5ΔA and 0.5ΔA on the upward side from the track center TC and also offsetting the same by 1.5ΔA and 0.5ΔA on the downward side from the track center TC for deriving the four-value digital information signal. This resulted in complicated formation of the groove 4 on the optical disc 2. In the present embodiment, the four-value digital information signal is recorded by forming the groove 4, for example, on the optical disc 2, on the track center TC, by offsetting the groove center GC by Tp/4 respectively on the upward and downward sides from the track center TC, and by not forming the groove 4. This simplifies the formation of the groove 4 on the optical disc 2, provides a recording of high density, and results in a high accuracy of the signals reproduced therefrom.

According to the invention, an optical disc for recording an information signal having a plurality of states has a portion on which a groove is formed in a predetermined direction, and the groove has a nominal position in the direction perpendicular to the predetermined direction over a predetermined length that represents a first state of the information signal. The disc also has a portion on which the groove is not formed that represents a second state of the information signal. The groove can also be displaced from its nominal position in the direction perpendicular to the predetermined direction over a predetermined length, the amount of the displacement representing at least one further state of the information signal. This arrangement provides a simple structure for recording an information signal having a plurality of states to be recorded and enables a high recording density to be obtained.

Also, according to the present invention as described above, light from a light emitting means reflected from an optical disc is detected by at least two detecting means, at least two detected signals from these at least two detecting means are calculated separately by first and second calculating means, and a multiple-value signal generating means provides a multiple value signal from a first result signal from the first calculation means based on the first and second result signals from the first and second calculation means, thereby producing a benefit that the multiple value signal can be easily and favorably derived from an optical disc.

Finally, according to the invention, a reproducing apparatus for reproducing an optical disc on which an information signal having a plurality of states is recorded has a light emitting means for emitting a light onto the optical disc, at least two detecting means each for generating an electrical signal in response to the light from the light emitting means reflected by the optical disc, a first and a second calculating means each for calculating at least one result signal in response to the electrical signals from the at least two detecting means, and a multiple-value signal generating means for generating an output signal having a plurality of states in response to a first result signal from the first calculating means and a third signal. The third signal is derived from the first result signal and a second result signal from the second calculating means. This arrangement enables an output signal having a plurality of states to be easily and accurately reproduced from the optical disc.

Having described a preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

What is claimed is:

1. An optical disc for recording a multiple value digital information signal, the optical disc comprising:
    (1) a data recording area including
        (a) a first portion on which a groove is formed to extend along a track centerline over a predetermined length to represent a first value of the information signal;
        (b) a second portion along the track centerline on which no groove is formed over the predetermined length to represent a second value of the information signal; and
        (c) a third portion on which the groove is formed to extend parallel to the track centerline over the predetermined length at a position laterally displaced from the track centerline, the third portion representing at least one additional value of the information signal, and
    (2) a synchronizing signal recording area where a series of pits representative of a clock signal are formed by periodically interrupting the groove along the track centerline.

2. In combination, an optical disc and a reproducing apparatus for reproducing the optical disc, comprising:
    (1) an optical disc which is provided with a groove formed along a track centerline, wherein the groove is divided into a reference signal recording area and a data recording area, the groove having in the data recording area a predetermined displacement amount in a direction perpendicular to the track centerline, and wherein there is a portion of the data recording area which is aligned along an extension of the track centerline and where no groove is formed, so that within the data recording area there are a center grooved portion, an off-center grooved portion, and a non-grooved portion representing an information signal having a plurality of information states, and wherein the reference signal recording area is divided into a synchronizing signal recording area portion, where a series of pits are formed representative of a clock signal by periodically interrupting the groove, and an amplitude recording area portion wherein a portion of the groove is displaced in a direction perpendicular to the track centerline;
    (2) light emitting means for emitting a light onto the optical disc;
    (3) at least two detecting means for detecting a light from said optical disc by means of said light emitting means;
    (4) first and second calculating means for separately calculating at least two detected signals from said at least two detecting means; and
    (5) multiple-value signal generating means for generating multiple values, based on first and second result signals from said first and second calculating means.

3. An optical disc as claimed in claim 1, wherein the multiple value signal is a four value digital signal and
    the disc includes a plurality of first, second, third, and fourth portions arranged in a plurality of concentric tracks;
    the groove in the third portion of the disc is laterally displaced from the track centerline by a displacement amount in a first direction to represent a third value of the information signal;
    the groove in a fourth portion of the disc is laterally displaced from the track centerline by a displacement amount in a second direction, perpendicular to the first direction, to represent a fourth value of the information signal; and
    wherein the displacement amount is one fourth of the pitch between adjacent tracks.

4. An optical disc as claimed in claim 1, wherein said predetermined length corresponds to a clock period for a digital signal to be recorded.

5. The combination as claimed in claim 2, wherein
    the multiple-value signal generating means comprises a multiple-value signal reproducing circuit, a clock signal generating circuit and a decision circuit, and
    the decision circuit generates a decision signal for the multiple-value signal reproducing circuit in response to the first and second result signals from the first and second calculating means, the decision signal having a predetermined high level when the first result signal has a high level and the second result signal has a low level.

6. In combination, an optical disc on which a multiple value digital information signal is recorded and a reproducing apparatus for reproducing the optical disc, comprising:
    (A) a disc including
        (1) a data recording area having a first portion on which a groove is formed to extend along a track centerline over a predetermined length to represent a first value of the information signal, a second portion along the track centerline on which no groove is formed over the predetermined length to represent a second value of the information signal, and a third portion on which a groove is formed to extend parallel to the track centerline over the predetermined length at a position laterally displaced from the track centerline, the third portion representing at least one further value of the information signal, and
        (2) a synchronizing signal recording area where a series of pits representative of a clock signal are formed by periodically interrupting the groove along the track centerline; and
    (B) a reproducing apparatus including
        (1) light emitting means for emitting a light onto the optical disc,
        (2) at least two detecting means, each for generating an electrical signal in response to the light from the light emitting means reflected by the optical disc;
        (3) a first calculating means for calculating a first result signal in response to the electrical signals from the at least two detecting means, and a second calculating means for calculating a second result signal in response to the electrical signals from the at least two detecting means; and (4) multiple-value signal generating means for generating an output signal having a plurality of values in response to the first result signal and the second result signal.

7. A combination as claimed in claim 6, further comprising a decision circuit means for deriving a third signal from the first result signal and the second result signal, and wherein the multiple-value signal generating means comprises a clock signal generating means for generating a clock signal in response to the second result signal, and a multiple-value signal reproducing circuit means for generating the output signal in response to the clock signal, the first result signal, and the third signal.

8. The combination as claimed in claim 2, wherein in the amplitude recording area portion there is a portion which is aligned along an extension of the track centerline and where no groove is formed so that within the amplitude recording area portion there are center grooved, off-center grooved, and non-grooved portions representing a reference signal having a plurality of information states.

* * * * *